(12) United States Patent
Dillow

(10) Patent No.: US 11,905,190 B2
(45) Date of Patent: Feb. 20, 2024

(54) REUSABLE BATH BOMB VESSEL

(71) Applicant: Andrew Dillow, New York, NY (US)

(72) Inventor: Andrew Dillow, New York, NY (US)

( * ) Notice: Subject to any disclaimer, the term of this patent is extended or adjusted under 35 U.S.C. 154(b) by 2 days.

(21) Appl. No.: 17/329,914

(22) Filed: May 25, 2021

(65) Prior Publication Data

US 2022/0064034 A1 Mar. 3, 2022

Related U.S. Application Data

(60) Provisional application No. 63/072,949, filed on Sep. 1, 2020.

(51) Int. Cl.
*C02F 1/00* (2023.01)
*A47K 3/00* (2006.01)
(Continued)

(52) U.S. Cl.
CPC ............. *C02F 1/688* (2013.01); *A47K 3/001* (2013.01); *C02F 2103/42* (2013.01)

(58) Field of Classification Search
CPC .. C02F 1/68; C02F 1/685; C02F 1/686; C02F 1/687; C02F 1/688; C02F 2203/00;
(Continued)

(56) References Cited

U.S. PATENT DOCUMENTS 1,595,828 A * 8/1926 Fuller .................... A63H 23/06
446/163

1,612,794 A * 12/1926 Bender .................. A63H 23/06
446/163
(Continued)

FOREIGN PATENT DOCUMENTS

CN 2159816 Y * 3/1994 ............ F16K 15/16
JP 2005334481 A * 12/2005
(Continued)

OTHER PUBLICATIONS

English translation of CN-210198197-U; Mar. 2020; Jia M; 16 pages. (Year: 2020).*
(Continued)

*Primary Examiner* — Magali P Slawski
*Assistant Examiner* — Robin S Gray
(74) *Attorney, Agent, or Firm* — Kenyon Jenckes

(57) ABSTRACT

A submersible vessel which can act as a reusable bath bomb delivery system is provided. The vessel may include a housing and an opening port. The interior of the housing and ports form a chamber, which can be segmented into multiple sub-chambers. Inlet one-way valve(s) and outlet one-way valve(s) are provided on the vessel. To use, the chamber is partially filled with a mixture including an effervescent material. When water is introduced through the inlet valve, it reacts with the effervescent material, releasing carbon dioxide and dissolving the other ingredients in the mixture, building pressure in the chamber. When the pressure builds to a certain level, the inlet valve(s) are closed, and the outlet valve(s) are opened. The outlet valves may be positioned such that when the fluid and gas is expelled, the force generated may cause the vessel to spin or be propelled in the bath.

7 Claims, 9 Drawing Sheets

(51) Int. Cl.
*C02F 1/68* (2023.01)
*C02F 103/42* (2006.01)

(58) Field of Classification Search
CPC ....... C02F 2103/42; A47K 3/034; A47K 5/06;
A47K 3/00; A47K 3/10; A61H 33/02;
A61H 2033/048; A61H 2033/023; A63H
33/28; A63H 33/3038; A63H 23/00;
A63H 23/04; A63H 23/06; A63H 23/10;
A63H 23/12; A63H 23/14; A63H 23/16;
A63H 29/10; A63H 29/14; A63H 29/16;
B01J 4/00; B01J 4/001
See application file for complete search history.

(56) References Cited

U.S. PATENT DOCUMENTS

| | | | | |
|---|---|---|---|---|
| 2,101,646 | A | * | 12/1937 | Gordon, Jr. ............ A63H 23/06 446/163 |
| 2,538,347 | A | * | 1/1951 | Yates ................... A63H 23/06 446/163 |
| 2,920,419 | A | * | 1/1960 | Giannone ............. A63H 23/10 472/128 |
| 3,721,038 | A | * | 3/1973 | Viczena ................ A63H 23/02 446/160 |
| 4,223,894 | A | * | 9/1980 | Fabricant ............. A63F 9/0243 273/350 |
| 4,274,223 | A | * | 6/1981 | Morrison ............... A63H 23/06 446/162 |
| 5,340,227 | A | * | 8/1994 | D'Andrade ......... B05B 11/3001 446/180 |
| 5,860,173 | A | | 1/1999 | Herring |
| 6,119,286 | A | | 9/2000 | Briscoe |
| 6,123,229 | A | * | 9/2000 | Barish .................. F41B 9/0012 446/180 |
| 6,180,115 | B1 | | 1/2001 | Conrard et al. |
| 2019/0314734 | A1 | * | 10/2019 | Cayton ................. A63H 23/14 |

FOREIGN PATENT DOCUMENTS

| | | | | |
|---|---|---|---|---|
| JP | 2007082967 A | * | 4/2007 | |
| KR | 102102205 B1 | | 4/2020 | |
| WO | WO-2005115329 A1 | * | 12/2005 | ............... A61K 8/02 |
| WO | WO-2010089724 A2 | * | 8/2010 | ............. A63H 23/12 |
| WO | WO-2017111497 A1 | * | 6/2017 | ............. A63H 23/06 |
| WO | WO-2019084982 A1 | * | 5/2019 | |

OTHER PUBLICATIONS

English Machine Translation of JP-2005334481-A (2005) (Godai) 8 pages (Year: 2005).*
English Machine Translation of WO-2005115329-A1 (2005) (Toyohiro) 9 pages (Year: 2005).*
English Machine Translation of JP-2007082967-A (2007) (Ohinata) 4 pages (Year: 2007).*
English Machine Translation for WO 2019084982 A1; Zhang (5 pages). (Year: 2019).*

* cited by examiner

REUSABLE BATH BOMB VESSEL

CROSS-REFERENCE TO RELATED APPLICATIONS

This application claims priority to U.S. Pat. No. 63,072,949 filed on Sep. 1, 2020 and entitled "Container Or Vessel That Holds Effervescent Salts And Can Be Placed In Water To Create a Reusable Bath Bomb", the entire contents of which are incorporated herein.

TECHNICAL FIELD

The present disclosure relates generally to a submersible vessel that, when filled with an effervescent material and submerged in water, allows the water into a chamber in the vessel and then allows the fizzing water out, and in particular to a reusable bath bomb.

BACKGROUND

There are a number of products for creating an effervescent bathing experience, such as bath bombs or salts. Some solutions offer a single use product where the salts are molded into a shape and dropped directly into the water. However, once the bath bomb is dissolved, the shape is lost and so the only option is for the user to use another bath bomb the next time.

Other products attempt to allow a user reuse a solid, dissoluble bath product a number of times by allowing the bath product to partially dissolve and then removing it from the water until the next use. However, these products can be messy to store as there is no container for the effervescent product, so after it has been used once, it continues to dissolve even when not in the water and may leave a residue when stored.

Still other products provide easily storable effervescent products that can simply be poured into a bath, but are not formed into a shape, and do not provide the novelty and fun of having the product fizz from the shaped material or container.

FIG. 1 shows a traditional single use effervescent bath product being formed in a mold. These are commonly referred to as bath bombs. A mixture 100 of an effervescent material along with other desired ingredients, such as fragrance, e.g., essential oils and/or aroma compounds, binding ingredients, epsom salts, coloring agents, etc., are packed into a mold 102 and formed into a shape. FIG. 2 shows the molded bath bomb 200 being placed into a bath, where it will slowly dissolve and fizz, releasing the other ingredients, such as fragrance and epsom salts.

SUMMARY

An object of this disclosure is to provide a device that makes an effervescent bath product, or bath bomb, which is reusable, rather than single-use, and which is easy to use and clean.

Another object of the disclosure is to provide a device that does not require excessive wasted packaging for each use.

Another object of the disclosure is to provide a device that can be created in various shapes, e.g., an animal or a cartoon or movie character, which can release a fizzing product and even travel or spin when dropped into water.

In an embodiment, a submersible vessel which can act as a reusable bath bomb delivery system is provided. The vessel may include a housing and at least one resealable opening port. The interior of the housing and ports form a chamber, which can be segmented into multiple sub-chambers.

At least one inlet one-way valve and at least one outlet one-way valve are provided on the vessel. The valves may be, for example, diaphragm check valves, however other types of valves may be used.

The chamber is partially filled with a mixture including an effervescent material. When water is introduced through the inlet valve, it reacts with the effervescent material, releasing carbon dioxide and dissolving the other ingredients in the mixture. This builds pressure in the chamber. When the pressure builds to a certain level, the inlet valve is closed. When the pressure builds to another level, the outlet valve is opened, releasing the reacted material and gas.

The outlet valves may be positioned such that when the fluid and gas is expelled, the force generated may cause the vessel to spin or be propelled in the bath.

DETAILED DESCRIPTION

Figure 1:
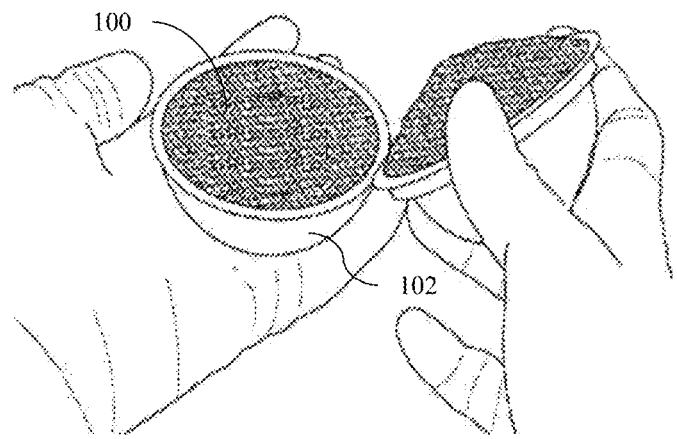
FIG. 1 is a perspective view of a traditional single use effervescent bath product being formed in a mold.
Figure 2:
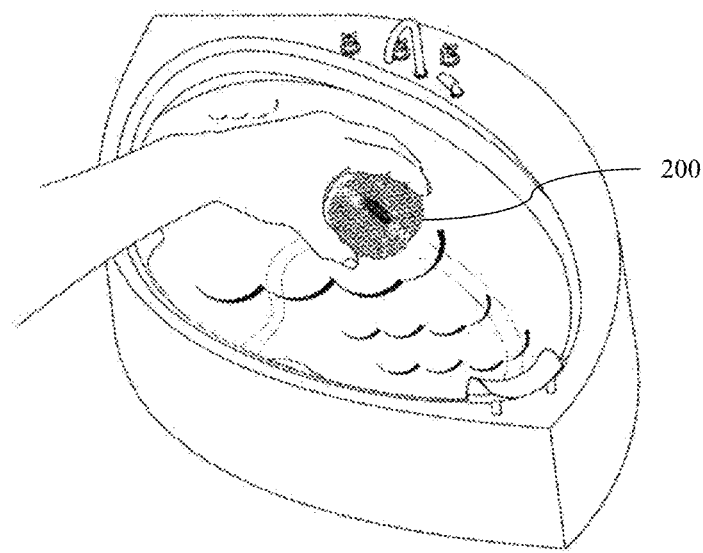
FIG. 2 shows the molded bath bomb being placed into a bath.
Figure 3:
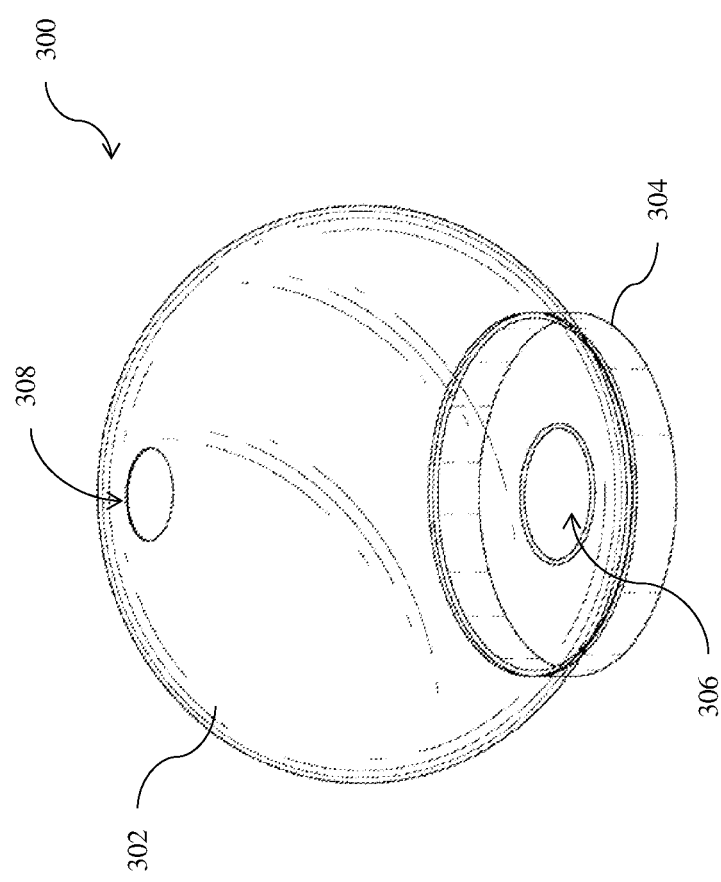
FIG. 3 is a perspective view of a basic housing for a reusable bath bomb vessel according to an embodiment.

FIG. 3 shows a basic housing 300 for a reusable bath bomb vessel according to an embodiment. A main body 302, in this case having a roughly spherical shape, includes a removable lid 304 at a base, the interiors of which form a chamber. The lid 304 may be threaded to screw onto the main body or otherwise secured, and may have a protruding turreted edge to permit fluid to flow into the chamber if the vessel is, for example, submersed and lying on the bottom of a bath.

One or more influx holes 306 may be provided in the lid 304 or other locations on the housing to enable water to enter the housing 300. One or more outflux holes 308 may be provided at the top or other locations on the housing to enable reacted product to fizz out of the housing 300.

In an embodiment, the material used for the construction of the body 302 and lid 304 may be a transparent plastic, although other materials may be used. In general, the material should be substantially rigid and waterproof.

Figure 4:
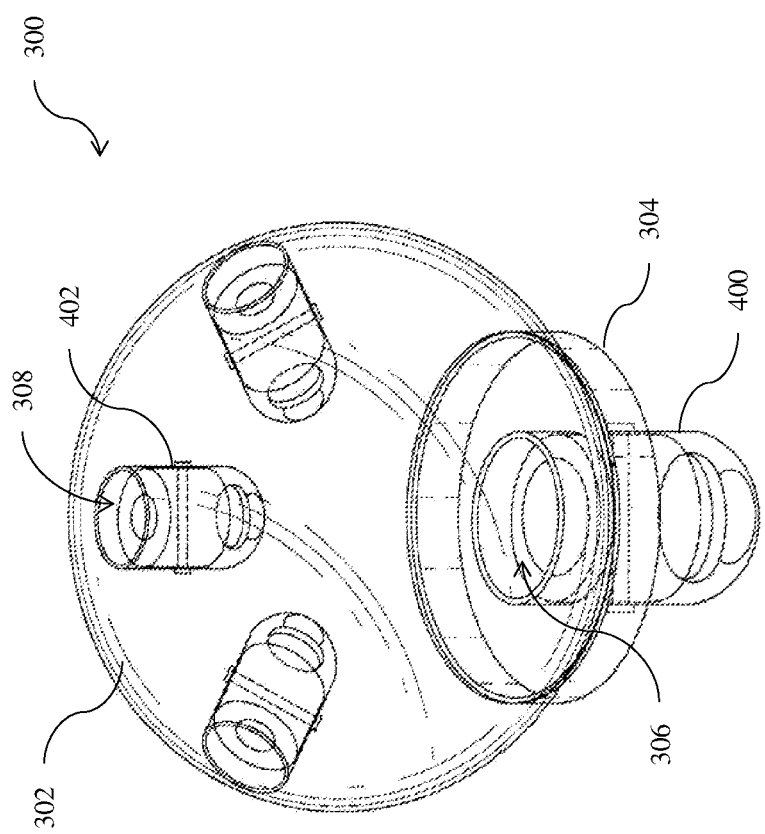
FIG. 4 is a perspective view of a vessel including inlet and outlet valves.

In an embodiment, an inlet one-way valve 400 configured to allow fluid into the chamber may be secured to the influx hole 306, as shown in FIG. 4. Outlet one-way valve(s) 402 configured to allow fluid and gas to exit the body 302 may be secured to the outflux hole(s) 308.

Figure 5:
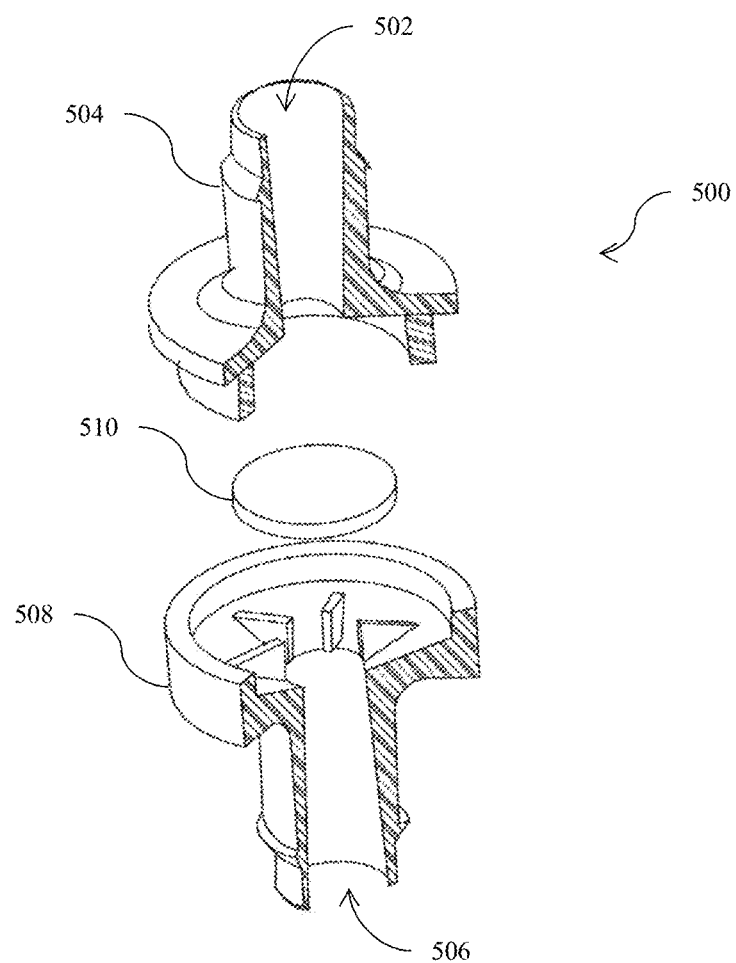
FIG. 5 is an exploded sectional view of a one-way flow valve according to an embodiment.
Figure 6B:
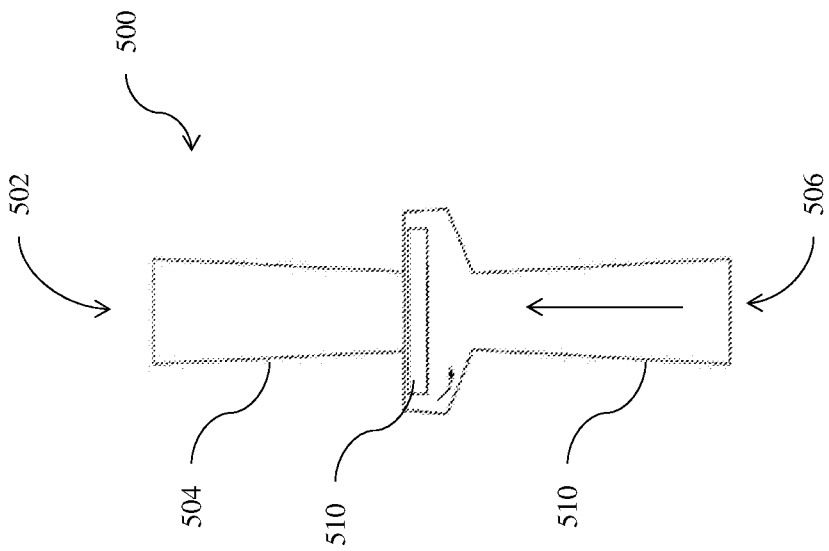
FIGS. 6A and 6B are sectional views illustrating the operation of a one-way valve.
Figure 6A:
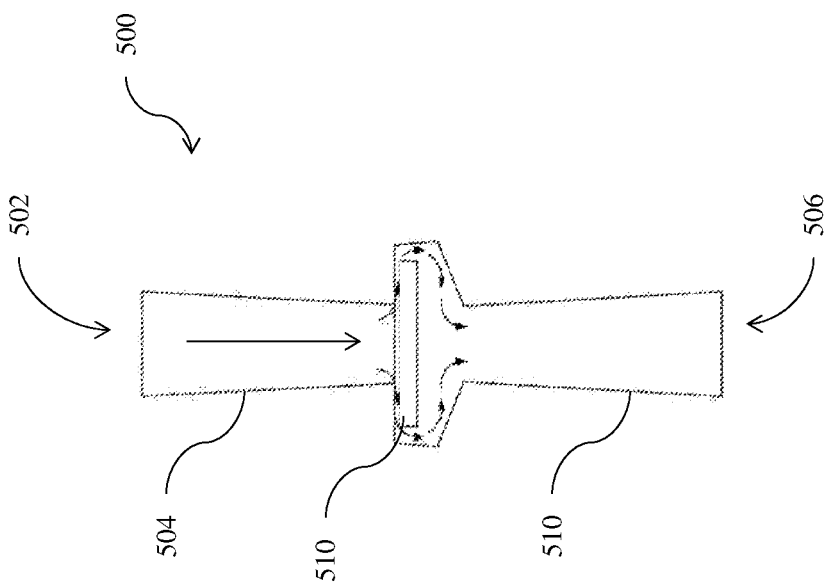

FIG. 5 shows an exploded sectional view of a one-way flow valve 500 according to an embodiment. The one-way flow valve 500 may be a diaphragm check, or non-return, valve. The valve 500 includes an inlet port 502 on an upstream section 504 and an outlet port 506 on a downstream section 508. The two sections 504, 508 are separated by a diaphragm 510. As shown in FIG. 6A, when fluid (represented by the lined arrows) flows through the inlet port 502 and creates a sufficient pressure differential between the upstream section 504 and the downstream section 508 to move the diaphragm 510, i.e., the valve's opening or cracking pressure, fluid flows into the downstream section 508 and out the outlet port 506. As shown in FIG. 6B, when the pressure of the fluid returning through the outlet port 506 increases to a point where the pressure differential between the fluid in the upstream and downstream sections fall below the valve's opening pressure, the valve closes, preventing further fluid through the valve 500. This may occur, for example, by pressure in the housing 300 increasing due to a reaction between the water and effervescent material in the housing.

Referring to the embodiment of the bath bomb receptacle shown in FIG. 4, the inlet valve 400 on the base (lid 304) may be configured to allow fluid into the housing 300, and the outlet valves 402 on the upper portion of the housing 300 may be configured to allow fluid and gas to escape the housing 300.

Other types of valves may be substituted for the diaphragm check valve for similar results, for example, ball check valves, reed valves, or a series of valves.

Figure 7:
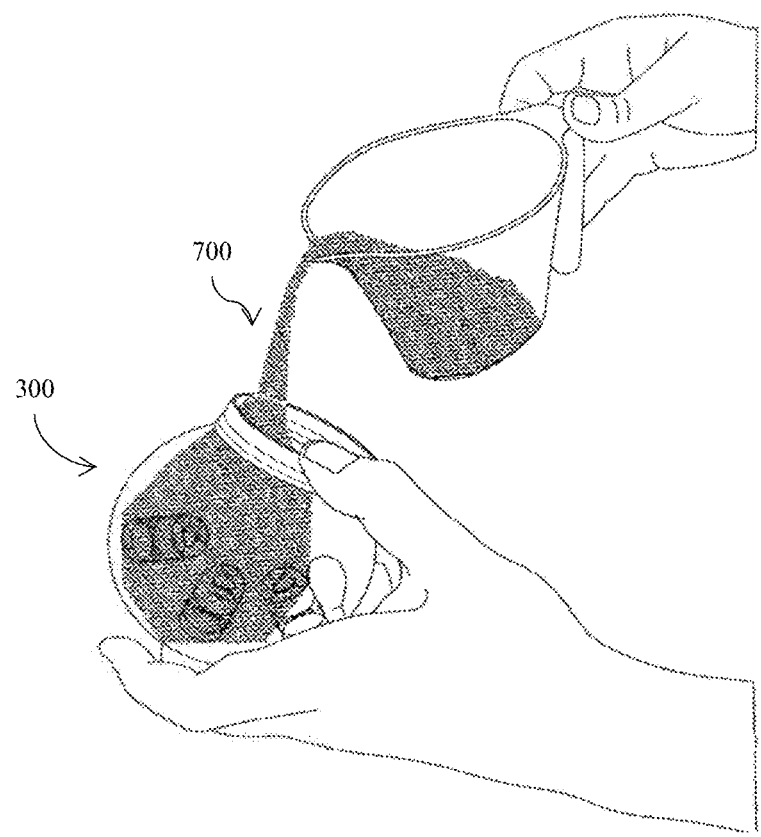
FIG. 7 shows a user partially filling the chamber of an exemplary vessel with a mixture including an effervescent material.

To use the reusable bath bomb vessel, the user may remove the lid 304 and pour a mixture 700 including an effervescent material into the body 302 of the housing 300, as shown in FIG. 7. The mixture may include, for example, an effervescent material along with other desired ingredients, such as a fragrance, e.g., essential oils and/or aroma compounds, epsom salts, coloring agent(s), etc. A commonly used and available effervescent material may include such ingredients as sodium bicarbonate and citric acid, but other ingredients are also contemplated, such as potassium, magnesium, and calcium carbonate salts and malic and tartaric acid.

The user may then re-secure the lid and place the housing into a bath or other body of water. Referring to the embodiment in FIG. 4, the user may need to partially submerge the housing 300 to provide enough pressure to exceed the opening pressure of the bottom inlet valve 400 and permit water into the chamber(s) including the mixture 700. As the water is allowed into the chamber to mix with the mixture 700, the reaction between the water and the effervescent material will start to produce pressure inside the chamber due to the release of carbon dioxide. At some point, the pressure differential between the upstream and downstream sections 504, 508, respectively, of the base inlet valve 400 may fall below the valve's opening pressure, and the valve will close.

When the pressure in the chamber exceeds the opening pressure of the outlet valves 402, the fizzing product will be released into the bath, creating a colorful, scented, fizzing experience.

The mixture 700 can, for example, be ordered and delivered as part of a monthly subscription service, or otherwise purchased. The user may then choose whatever combination of salts, fragrances, colors, etc., that they wish to create a unique and custom bath experience with their own color and scent combinations by filling the shaped receptacle with personalized mixture and dropping the vessel into the water (may be, but not limited to, a bath) to create the color and scent effect that they desire.

Figure 8:
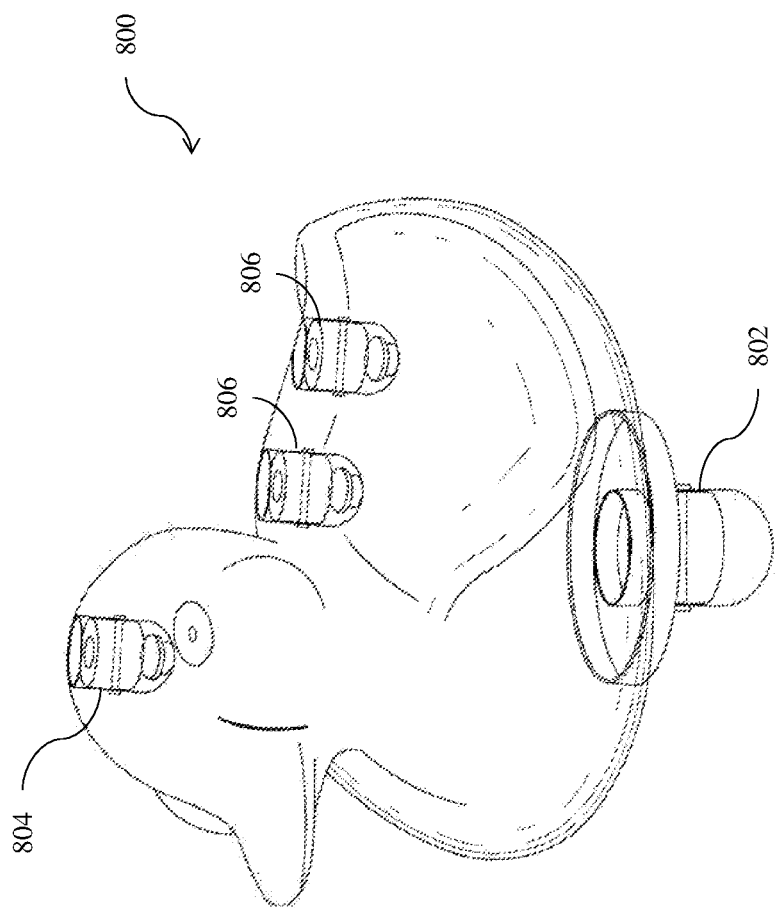
FIG. 8 is a perspective view of a vessel having a duck shape according to an embodiment.

The housing may be created in a variety of shapes. For example, in the embodiment shown in FIG. 8, the vessel 800 has a duck shape to recreate the classic rubber duck bath toy. In this embodiment, water is allowed into the chamber through valve 802 and the fizzing product ejected from the valves at the head and body 804, 806, respectively.

Figure 9:
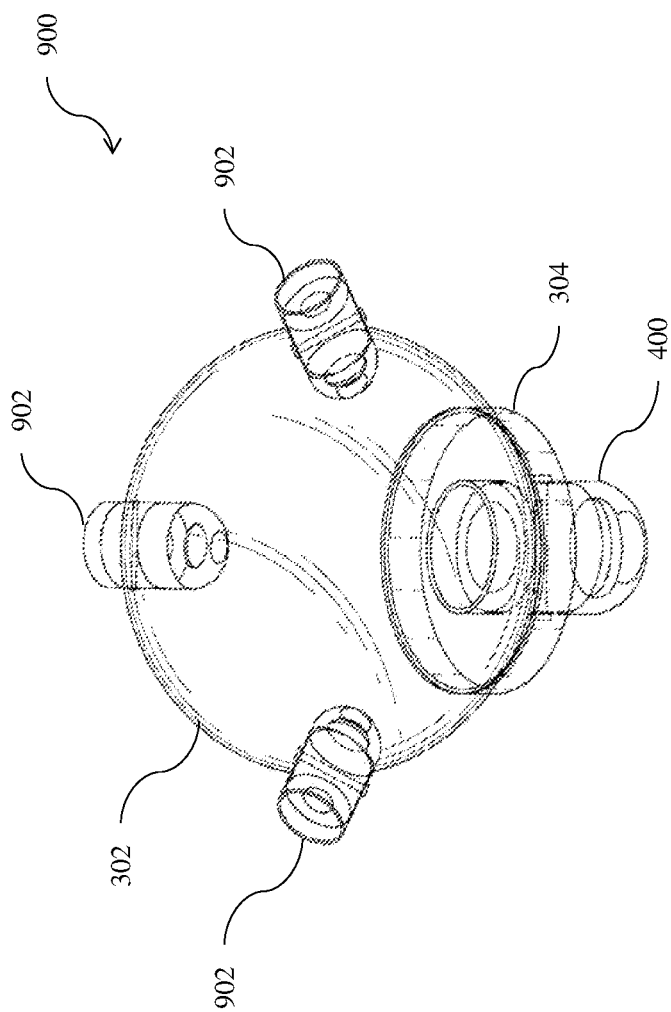
FIG. 9 is a perspective view of a vessel with outlet valves positioned to create a rotating effect when fluid and gas is ejected from the valves.

In an embodiment shown in FIG. 9, the outlet valves 902 may be positioned on the vessel 900 in the same direction, such that the force generated when the fizzing product is ejected from the valves will create sufficient momentum to cause the vessel to tend to spin in the water. The outlet valves may also be provided on the same side of the vessel, tending to propel the vessel in the opposite direction.

The chamber may be segregated into sub-chambers, each including at least one input valve and one output valve and access by the user to place differently colored mixtures into the different sub-chambers. When the fizzing product is ejected from the different sub-chambers, different colors will be dispersed into the water, creating a rainbow effect.

In an embodiment the vessel chamber may be less than four litres to accommodate the size of a typical bath, although other sizes are contemplated.

Figure 10:
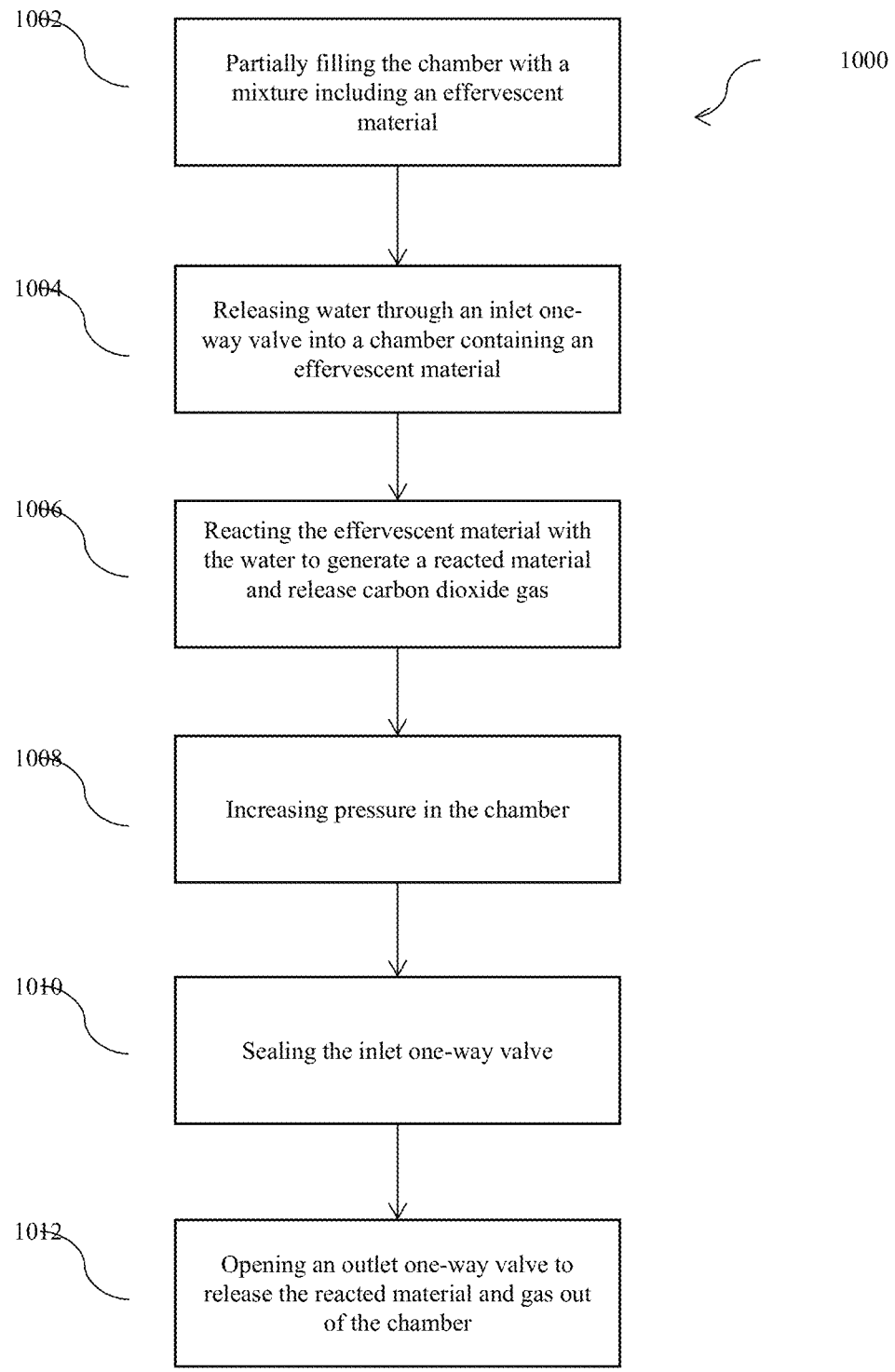
FIG. 10 is a flowchart showing a bath bomb vessel operation according to an embodiment.

FIG. 10 is a flowchart showing a bath bomb vessel operation 1000 according to an embodiment. The chamber may be partially filled with a mixture including an effervescent material 1002. Water is then released into the chamber through an inlet one-way valve 1004. The water reacts with the effervescent material to generate a reacted material and release carbon dioxide gas 1006. This in turn increases pressure in the chamber 1008. When the pressure increases such that it reduces the differential pressure at the inlet valve below the opening press, the inlet valve is sealed 1010. When the pressure increases such that the opening pressure of the outlet one-way valve is overcome, then the reacted material and gas is released out of the vessel 1012.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A submersible vessel for delivery of bath products comprising:
   a housing;
   a resealable opening port, wherein an interior of the housing and an interior of the resealable opening port comprise an empty chamber, the resealable opening port configured to be sealed in a sealed configuration;

an influx hole, said influx hole including an inlet one-way valve configured to permit fluid flow into the chamber, said inlet one-way valve having a first pressure threshold configured to accept water from a container of water into the chamber when the vessel is submerged in the container of water and the opening port is in the sealed configuration and a second pressure threshold configured to close the inlet one-way valve at a pressure corresponding to a first internal pressure generated by a chemical reaction between the water accepted into the chamber and an effervescent material in the chamber when the opening port is in the sealed configuration; and a plurality of outflux holes, each of said outflux holes including an outlet one-way valve having a pressure threshold configured to permit fluid to be ejected out of the chamber at a pressure corresponding to a second internal pressure generated by the chemical reaction between the water accepted into the chamber and the effervescent material in the chamber when the opening port is in the sealed configuration, the plurality of outflux holes situated on the housing in a configuration to cause the housing to spin when fluid is ejected out of the chamber through said outlet one-way values, wherein in the sealed configuration said water from the container can only enter the chamber through the inlet one-way valve, wherein the second internal pressure is greater than the first internal pressure, and wherein the resealable opening port includes a removable lid adapted to cover the opening port, the lid including the influx hole and said inlet one-way valve.

2. The submersible vessel of claim 1, wherein the housing and the resealable opening port comprise a transparent material.

3. The submersible vessel of claim 1, wherein the inlet one-way valve comprises a diagram check valve, and wherein the outlet one-way valve of each the plurality of outflux holes comprise diaphragm check valves.

4. The submersible vessel of claim 1, wherein a volume of the chamber is less than four litres.

5. The submersible vessel of claim 1, wherein said plurality of outflux holes comprises three outlet ports.

6. The submersible vessel of claim 1, wherein said plurality of outflux holes are spaced about the housing.

7. The submersible vessel of claim 1, wherein the chamber is configured to eject a different colored fluid out of each of the plurality of outflux holes.

* * * * *